United States Patent Office 3,057,836
Patented Oct. 9, 1962

3,057,836
POLYMERISATION PROCESS
Donald Alexander Fraser, Sutton, and Alaric Louis Jeffrey Raum, Teddington, England, assignors to The Distillers Company Limited, Edinburgh, Scotland, a British company
No Drawing. Filed Jan. 28, 1957, Ser. No. 636,524
Claims priority, application Great Britain Feb. 17, 1956
9 Claims. (Cl. 260—93.7)

The present invention relates to a process for the polymerisation of α-olefins having at least three carbon atoms in the molecule to give high molecular weight products which are of great general utility. It relates particularly to a process for the production of high molecular weight products under mild conditions of temperature and pressure. A further and more limited aspect of the invention relates to the production of isotactic or crystalline polymers from certain α-olefins.

According to the present invention the process for the polymerisation of an α-olefin having at least three carbon atoms in the molecule comprises contacting the α-olefin with a catalyst system formed by mixing lithium borohydride with a titanium, zirconium or vanadium halide.

Any α-olefin having at least three carbon atoms in the molecule can be polymerised according to the present invention. Such olefins can be represented by the formula R—CH=CH$_2$ where R is an alkyl, cycloalkyl, or aryl group and examples are propylene, 1-n-butene, 1-n-pentene, 1-n-hexene, and vinyl hydrocarbons such as styrene. The present invention is particularly useful for the polymerisation of aliphatic α-olefins. α-olefins can be polymerised alone to form homopolymers or as mixtures among each other or with ethylene to form valuable copolymers.

Lithium borohydride is known and is a well defined crystalline solid having the formula LiBH$_4$. It is readily available and has the advantage that it is unaffected when exposed to dry air for long periods of time.

Any titanium, zirconium or vanadium halide can be employed and most suitably the chlorides of these metals in their tri- or tetravalent form are used. The preferred compounds to use as components of the catalyst system are titanium tetrachloride and vanadium tetrachloride. Titanium trichloride when prepared as described in our co-pending British application No. 14,019/56 and zirconium tetrachloride are other specific examples of suitable components of catalyst systems according to the present invention.

The proportion of lithium borohydride to the halide compound is not critical, and active polymerisation systems can be obtained from mixtures of from 1 to 20 molar proportions of lithium borohydride with from 10–1 molar proportion of the halide compound. When titanium and zirconium tetrachlorides are employed useful and economic catalyst systems are obtained by mixing the two ingredients in the approximate proportions of two molar proportions of lithium borohydride to one of the tetrachloride compound.

The preparation of the catalyst system by mixing the lithium borohydride with the halide compound and the subsequent polymerisation are preferably effected in the complete absence of molecular oxygen and of water. Most suitably the polymerisation is carried out in an atmosphere of the α-olefin to be polymerised, when it is a gas, or of an inert gas, for example, argon, when the olefin is a liquid. Inert gases can be used to flush out the polymerisation vessel prior to the admission of the various component compounds of the reaction mixture. The catalyst system or its components are destroyed by reaction with oxygen or water and, consequently, if any of these is present in excess no polymerisation will take place. Small quantities of oxygen or water are removed by reaction with part of the catalyst system or its components and any undestroyed catalyst left after this reaction initiates polymerisation in the usual way.

The polymerisation reaction is most suitably carried out with the components of the catalyst system dispersed or dissolved in an inert liquid vehicle. Most suitably the inert liquid vehicle consists of a solvent for one of the compounds which react together to make the catalyst system and for the α-olefin to be polymerised. Examples of the preferred liquid vehicles are aliphatic, cycloaliphatic and hydrogenated aromatic hydrocarbons such as pentane, hexane, cyclohexane, tetrahydronaphthalene and decahydronaphthalene and mixtures thereof. The higher paraffins, aromatic hydrocarbons, such as benzene and xylene, halogenated aromatic hydrocarbons such as ortho-dichlorbenzene and chlorinated naphthalene and mixtures thereof can also be employed but fully saturated compounds are preferable. The quantity of liquid vehicle employed can be varied considerably and should be such that the final recovery of the poly-α-olefin is facilitated.

The process of the present invention can readily be brought about by mixing the two components forming the catalyst system with an inert liquid vehicle in a suitable vessel and then allowing the α-olefin to enter the vessel. Alternatively, the components of the catalyst system can be mixed in the presence of the α-olefin to be ploymerised. In this embodiment the lithium borohydride or the halide compound is mixed with a suitable liquid vehicle, for instance, one of those mentioned above, and the liquid mixture is saturated with the α-olefin. The other component of the catalyst system is then added when it will be found that rapid polymerisation takes place and further quantities of the α-olefin may be passed into the reaction mixture and polymerised. It is generally advantageous to stir the reaction mixture vigorously during the polymerisation reaction.

The catalyst systems of the present invention can be very active and polymerisation can be initiated at normal ambient temperatures for easily polymerisable α-olefins, such as for example propylene, when using a particularly active catalyst. Most suitably the temperature of polymerisation is at least 30° C. The rate of polymerisation is increased by raising the temperature of the reaction mixture, but normally it is undesirable to employ temperatures above about 150° C. It should be noted that above such a temperature there is a danger that the efficiency of the catalyst system may be reduced and perhaps destroyed. A convenient temperature range within which the polymerisation may be carried out at a useful rate is 50°–150° C. When the polymerisation is to be carried out at an elevated temperature, the mixture forming the catalyst system can be heated either before or after the introduction of the α-olefin.

The preferred temperature for the polymerisation of propylene in a solvent such as petroleum ether (boiling point range 100–120° C.) is about 80° C. At 100° C. an inhomogeneous product may result due to the partial solubility of the polymer in the liquid reaction medium at this temperature. On cooling the reaction mixture polymer is precipitated from solution resulting in two fractions of polymer being present in the final product. As the temperature of the reaction is increased this partial solubility effect disappears owing to the increased solubility of the polymer in the reaction mixture. At 120° C. polypropylene produced according to the present invention is almost completely soluble in petroleum ether and, consequently, a fairly homogeneous product is obtained. When the polymerisation is carried out at 80° C. a substantially homogeneous product is obtained because very little of the produced polymer dissolves.

If a particularly active catalyst system is required, i.e.

one capable of bringing about rapid polymerisation at comparatively low temperatures, i.e. temperatures below 70° C. it is advantageous to prepare the system in an inert liquid vehicle at a higher temperature, for example 100° C. or above. Once prepared the catalyst system is cooled and the α-olefin is admitted when polymerisation will take place. For example, propylene is readily polymerised at 60° C. or below if the catalyst system prepared in advance by stirring the lithium borohydride with the halide compound for say 15–30 minutes at 100° C.

It is unnecessary to employ elevated pressures in order to bring about the polymerisation of α-olefins according to the present invention. However, for convenience of handling normally gaseous α-olefins it may be advantageous in certain circumstances to employ slightly elevated pressures and accordingly, in such cases, the polymerisation process can be carried out with the α-olefin under a pressure in the range 15–500 pounds per square inch gauge (p.s.i.g.).

The poly-α-olefins produced by the present invention can be recovered from the reaction mixture and worked into a final form by any convenient processes. It is advantageous to carry out a preliminary treatment of the polymer with methyl or ethyl alcohol before air is admitted to the polymerisation vessel and to include a mineral acid washing stage in the working up in order to remove inorganic contaminants.

The process may be carried out batchwise or continuously and by its use high yields of high grade polymers can be produced.

A particularly important aspect of the process of the present invention is in its application to the polymerisation of propylene and, to a more limited extent, of 1-n-butene to give rise to isotactic or crystalline polymers. Isotactic polymers are known and consist of linear polymers of α-olefins in which the individual polymer units bear a define spacial relationship to each other with the result that the polymers exhibit high crystallinity. Highly crystalline polymers of α-olefins have many advantages over amorphous polymers of the same molecular weight. They possess higher softening points, densities and tensile strengths and greater rigidities and, consequently, have many more commercial uses.

When the process of the present invention is applied to the polymerisation of propylene or of 1-n-butene and the catalyst system employed is derived from lithium borohydride and titanium chlorides, i.e. titanium tetrachloride or titanium trichloride, very valuable polymers containing a high proportion of crystalline material can be produced. Under suitable conditions the polymerisation of propylene is brought about to give isotactic polypropylene containing substantially only crystalline material.

The amount of crystalline material in the produced polymer varies with the conditions under with the polymerisation is carried out. It depends on the temperatures at which the catalyst system is formed and the polymerisation is effected. It also depends on the molar ratio of lithium borohydride to the titanium chloride compound employed in the preparation of the catalyst system. Good yields of polymeric material containing a high proportion of crystalline polypropylene are obtained by preparing the catalyst system and carrying out the polymerisation in an inert liquid vehicle, for instance an aliphatic, cycloaliphatic or hydrogenated aromatic hydrocarbon, at a temperature in the range of 70° C. to 120° C., using a molar ratio of lithium borohydride to titanium chloride compound in the range 1.5:1 to 7:1. The polymerisation of 1-n-butene to give polymeric material containing a useful proportion of crystalline material can be brought about using a similar polymerisation system.

The following examples illustrate methods of polymerising α-olefins according to the present invention. The parts by weight (p.b.w.) and the parts by volume (p.b.v.) bear the same relationship to each other as do grams to millilitres.

EXAMPLE 1

2 p.b.w. of titanium tetrachloride contained in a glass phial were placed in a steel reaction vessel having a capacity of 300 p.b.v. together with a steel ball, 2 p.b.w. of lithium borohydride and 100 p.b.v. of petroleum ether (100–120° C. fraction). Propylene was passed into the vessel. The temperature of the reaction vessel was raised to 100° C. by heating on a water bath and the titanium tetrachloride phial broken by the steel ball. During one hour the pressure fell from 300 to 160 p.s.i.g. at the end of which time the reaction was stopped. Methanol was added to decompose any unreacted catalyst, and the product washed first with methanolic hydrochloric acid and then with pure methanol. In this way pure white, solid polypropylene was obtained in good yield.

EXAMPLE 2

A reaction was carried out in a similar manner to Example 1 using 1-n-butene in place of propylene. After 90 minutes' reaction at 100° C. the pressure fell from 100 to 70 p.s.i.g. The polymer was isolated in a similar way to Example 1, and a good yield of solid, white poly-butene obtained.

EXAMPLE 3

1 p.b.w. of lithium borohydride and 1 p.b.w. of titanium tetrachloride were mixed with 100 p.b.v. of petroleum ether (100–120° fraction) in a glass tube which was placed in a steel reactor. Styrene was added and the temperature raised to 100° C., the reaction being allowed to proceed for two hours. After removal from the reactor the contents were treated with methanol and hydrochloric acid. The product was filtered, washed with methanol and dried. The product was pure white polystyrene.

The following examples show the preparation of crystalline polypropylene using a catalyst system formed from lithium borohydride and titanium tri- and tetra-chlorides and illustrate the variation of crystalline content with polymerisation conditions.

EXAMPLE 4

1.6 p.b.w. of lithium borohydride, 7.0 p.b.w. of titanium tetrachloride and 500 p.b.v. of dry petroleum ether (100–120° fraction) were placed in a stirred stainless steel reaction vessel. The temperature of the contents of the vessel was raised to 100° C. and held at this temperature for 30 minutes. The vessel was then cooled to 30° C. and propylene passed in to a pressure of 90 p.s.i.g. The reaction mixture was maintained at 30° C. for 2½ hours and was then allowed to cool gradually to 20° C. After a total polymerisation time of 20 hours the reaction was stopped and the polymer recovered as in Example 1. Solid, white polypropylene was obtained which was shown by infra-red analysis to have a crystallinity of 81%.

EXAMPLES 5 TO 10

A series of polymerisations of propylene were carried out at 25 p.s.i.g. in a stainless steel reactor vessel fitted with a stirrer. The catalyst system was prepared by mixing lithium borohydride with titanium tetrachloride in the reaction vessel at the temperature at which the polymerisation was carried out, the molar ratio of the components being varied from 6.7:1 to 1.9:1 and the temperature from 60–120° C. The reactions were carried out in water-free petroleum ether (100–120° C. fraction) such that 0.76 mole per litre of lithium borohydride were present. The total polymerisation time was 5 hours in each case.

Excellent yields of highly crystalline polypropylene were obtained, the percentage crystallinity of the polymers obtained as determined by infra-red analysis being shown in Table 1. These values are from 10–20% higher than those obtained from samples of polypropylene which had been formed by comparable polymerisations carried out with the known catalyst system triethyl aluminium/titanium tetrachloride in the temperature range 40 to 60° C. and with molar ratios ranging from 1:1 to 3:1.

Table 1

| Example No. | Temperature, ° C. | Molar Ratio $LiBH_4:TiCl_4$ | Percent Crystallinity |
|---|---|---|---|
| 5 | 60 | 2:1 | 74 |
| 6 | 80 | 1.9:1 | 95 |
| 7 | 100 | 3.3:1 | 90 |
| 8 | 110 | 6.7:1 | 98.5 |
| 9 | 110 | 2:1 | 96.5 |
| 10 | 120 | 3.9:1 | 91 |

EXAMPLE 11

Into a stainless steel reaction vessel fitted with a stirrer was placed 1.7 p.b.w. of lithium borohydride, 7.0 p.b.w of titanium tetrachloride and 500 p.b.v. of petroleum ether (100–120° fraction). 1-n-butene was admitted to the vessel and the temperature raised to 100° C. After four hours polymerisation time the reaction was stopped and the polymer recovered as in Example 1. Solid, white polybutene was obtained. Extraction of this material with diethyl ether left a residue (48% of the total polymer) which had a crystalline melting point measured by a dilatometric method of 121° C.

We claim:

1. A process for the polymerisation of an α-olefin having the formula $R—CH=CH_2$ where R is selected from the group consisting of alkyl, cycloalkyl and aryl groups which comprises contacting the α-olefin with a catalyst system formed by mixing lithium borohydride with a halide compound selected from the group consisting of titanium, zirconium and vanadium halides.

2. A process as claimed in claim 1, wherein the halide compound is a chloride.

3. A process as claimed in claim 1, wherein the halide compound is titanium tetrachloride.

4. A process as claimed in claim 1, wherein the α-olefin is an aliphatic α-olefin.

5. A process as claimed in claim 1, wherein the polymerisation reaction is carried out in an inert liquid vehicle selected from the group consisting of aliphatic, cycloaliphatic and hydrogenated aromatic hydrocarbons.

6. A process as claimed in claim 1, wherein the polymerisation reaction is carried out at a temperature in the range 50 to 150° C.

7. A process for the production of crystalline polypropylene which comprises contacting propylene at a temperature in the range of 70° to 120° C. with a catalyst system formed by mixing lithium borohydride with a titanium chloride compound selected from the group consisting of titanium tetrachloride and titanium trichloride in an inert liquid vehicle, the molar ratio of lithium borohydride to the titanium chloride compound being in the range of 1.5:1 to 7:1.

8. A process as claimed in claim 7 wherein the polymerisation is carried out at about 80° C.

9. A process for the production of poly-1-n-butene containing crystalline material which comprises contacting 1-n-butene at a temperature in the range 70 to 120° C. with a catalyst system formed by mixing lithium borohydride with a titanium chloride compound selected from the group consisting of titanium tetrachloride and titanium trichloride in an inert liquid vehicle, the molar ratio of lithium borohydride to the titanium chloride compound being in the range of 1.5:1 to 7:1.

References Cited in the file of this patent

UNITED STATES PATENTS

| | | |
|---|---|---|
| 2,728,757 | Field et al. | Dec. 27, 1955 |
| 2,822,357 | Brebner et al. | Feb. 4, 1958 |
| 2,839,518 | Brebner | June 17, 1958 |

FOREIGN PATENTS

| | | |
|---|---|---|
| 538,782 | Belgium | Dec. 6, 1955 |
| 801,401 | Great Britain | Sept. 10, 1958 |